US006767382B2

(12) United States Patent
Stratigos et al.

(10) Patent No.: US 6,767,382 B2
(45) Date of Patent: Jul. 27, 2004

(54) ALUMINIUM PROCESSING APPARATUS AND PROCESS FOR SEPARATING ALUMINIUM FROM A MIXTURE OF ALUMINIUM AND ALUMINIUM DROSS

(75) Inventors: Andreas Stratigos, Piraeus (GR); Brendan O'Neill, Victoria (AU)

(73) Assignee: Mawar Malaysian Limited, Labuan (MY)

(*) Notice: Subject to any disclaimer, the term of this patent is extended or adjusted under 35 U.S.C. 154(b) by 0 days.

(21) Appl. No.: 10/612,390

(22) Filed: Jul. 2, 2003

(65) Prior Publication Data

US 2004/0050211 A1 Mar. 18, 2004

Related U.S. Application Data

(63) Continuation-in-part of application No. 09/305,782, filed on Apr. 30, 1999, now abandoned, which is a continuation of application No. PCT/AU99/00260, filed on Apr. 8, 1999.

(51) Int. Cl.[7] .............................. C22B 21/00; C22B 7/04
(52) U.S. Cl. .............................. 75/375; 75/386; 75/672; 266/78; 266/80; 266/91; 266/157; 266/227
(58) Field of Search .......................... 75/375, 386, 672; 266/78, 80, 91, 157, 227

(56) References Cited

U.S. PATENT DOCUMENTS

| 3,198,505 A | 8/1965 | Amdur et al. |
| 3,689,904 A | 9/1972 | Brumagin et al. |
| 3,861,660 A | 1/1975 | Ammann et al. |
| 4,938,457 A | 7/1990 | Singleton, Jr. |
| 5,788,918 A | 8/1998 | Bramley |
| 5,900,039 A | * 5/1999 | Kos ............................. 75/404 |

FOREIGN PATENT DOCUMENTS

| AU | A-56260/98 | 9/1998 |
| EP | 07216471 | 8/1995 |
| EP | 09087764 | 3/1997 |
| GB | 201817 | 8/1923 |
| GB | 740500 | 11/1955 |
| GB | 954512 | 4/1964 |
| GB | 1 533 696 | 11/1978 |
| GB | 2 327 683 | 2/1999 |
| GR | 970100106 | 3/1997 |

* cited by examiner

Primary Examiner—Melvyn Andrews
(74) Attorney, Agent, or Firm—Katten Muchin; Zavis Rosenman (57) ABSTRACT

An apparatus for separating molten aluminium from a mixture of molten aluminium and aluminium dross includes a table for supporting an insulated crucible containing the mixture of molten aluminium and aluminium dross. A rotatable frame supports a plurality of tines which can be lowered into the mixture in the crucible for stirring the mixture. Vibration means are provided enabling simultaneous vibration of the crucible and stirring of the mixture. The tines cuts through the dross in a shearing action gently rolling the dross, mixing and tumbling it and causing the droplets of aluminium to coalesce. The aluminium droplets and particles in the dross coalesce to form larger droplets and gradually sink to the base of the crucible. A screening means is disposed to substantially surround the crucible when it is supported by the table, which includes a door to both allow and prevent access to the crucible.

21 Claims, 5 Drawing Sheets

VIEW Y

ALUMINIUM PROCESSING APPARATUS AND PROCESS FOR SEPARATING ALUMINIUM FROM A MIXTURE OF ALUMINIUM AND ALUMINIUM DROSS

This application is a continuation-in-part of U.S. application Ser. No. 09/305,782 filed Apr. 30, 1999 now abandoned, which is a continuation of PCT/AU99/00260 filed Apr. 8, 1999.

FIELD OF THE INVENTION

This invention relates to an aluminium processing apparatus for separating aluminium from a mixture of aluminium and aluminium dross, and to a related process for separating aluminium from a mixture of aluminium and aluminium dross. In particular, the invention relates to a process for recycling aluminium from dross produced during an aluminium melting processes, and to an aluminium processing apparatus for carrying out that recycling process.

BACKGROUND OF THE INVENTION

When aluminium is melted eg. for manufacture of extrusions, ingots and billets, because of the influence of oxygen from environmental air on the aluminium and the existence of impurities, particularly oxides, nitrides and carbides, in the molten aluminium, a layer of sludge, also known as dross rises to the surface of the molten aluminium. This layer of dross has to be removed from the molten aluminium before the molten aluminium can be cast. This is done by the use of a ladle in a rather crude process, known as skimming, in which the ladle is dragged across the top of the molten aluminium and the dross is scraped into a suitable receptacle. During the skimming process, as well as removing sludge including oxides and other impurities, pure aluminium is also removed. The quantity of pure aluminium removed depends on the depth to which the ladle is inserted in the aluminium to ensure removal of all the dross and to a large extent depends on the skill of the furnace worker handling the ladle. However, typically 30 to 60% of the mixture/dross, by weight is aluminium.

The term dross, as used herein, refers to the impurities such as oxides which float to the surface of the molten aluminium, but the term is also used in the art to refer to the mixture of aluminium and the impurities.

Because of the amount of aluminium in the mixture, it is obviously desirable to remove as much aluminium from the dross/aluminium mixture as possible. Almost all recycling is currently carried out using a process known as rotary salt furnace processing. In that process, the dross containing pure aluminium is first allowed to cool. The longer the aluminium spends hot, the more oxidation occurs and less aluminium is recovered in the recycling process, so often cooling is encouraged and accelerated. In some cases some initial separation of aluminium from the mixture is first carried out by one of two rather inefficient devices know as drain pans and dross presses, respectively. In the former the mixture is allowed to sit while molten and some of the aluminium will sink to, and agglomerate in, the bottom of the pan. In the latter, the mixture is compressed and the aluminium droplets tend to stick together. U.S. Pat. No. 5,788,918 to Bramely discloses one example of a dross press. These processes are inefficient and have to be followed by rotary salt processing or other methods of external dross processing. Because the mixture is kept hot longer for the drain pan or dross press process, the recovery rate in the subsequent rotary salt process is reduced, so drain pans and dross presses are generally not commercially viable, and are not often used.

Recycling is not generally done at the furnace, but is usually is done by specialist metal-recycling companies. In the rotary salt recycling process, the dross is heated and remelted and various salts and fluxes are added in order to separate the aluminium from the oxides and other impurities. While the process is highly efficient in terms of the quantity of aluminium removed from the dross, removing approximately 85% of the available aluminium, the waste products from the recycling process, ie the mixture of salts and the oxides, is unpleasant, very environmentally unfriendly, and difficult to dispose of safely. Further, the process requires the transporting of the dross to the recycler in trucks or the like which is also undesirable from an environmental point of view, and inefficient in terms of fuel. Also, the dross has to be remelted in order to extract the aluminium in the recycling process which requires a substantial amount of energy. There are some smelting plants which have their own rotary salt recycling furnace, however, the process of cooling and transporting the cooled mixture to the furnace remains the same, although savings are made in total transport costs.

Proposals have been made for separating aluminium from dross in the past. GB 1533696 and U.S. Pat. No. 3,689,049 disclose two different devices for separating aluminium from dross. Neither device has had any commercial success, perhaps because they are over-complicated and too unreliable for the extreme environment in which they have to operate.

The present inventor has also invented an apparatus and process, disclosed in AU 56260/98, and Greek patent No 97-0100106 that provides a simpler and more cost effective method of recycling aluminium from dross. The present invention is directed to improvements to the apparatus earlier developed by the inventor.

SUMMARY OF THE INVENTION

In a first aspect of the present invention there is provided an aluminium processing apparatus for separating molten aluminium from a mixture of molten aluminium and aluminium dross comprising:

a table for supporting an insulated crucible, the crucible having an open top for containing the mixture of molten aluminium and aluminium dross;

vibration means for vibrating the crucible when supported on the table;

a frame adapted to support a paddle means, means for rotating the paddle means and means for relatively lowering the paddle means into the mixture in the crucible for stirring the mixture with the paddle means, the paddle means comprising a plurality of tines having a generally triangular cross section with a ridge of the triangular cross section being uppermost in use when lowered into the crucible;

a shroud adapted to cover the top of the crucible and maintain an oxygen reduced atmosphere in the crucible; and a screening means comprising walls mounted to the frame which substantially surround the crucible when it is supported by the table, the screening means having at least a portion thereof movable between at least a first retracted position to allow access to the crucible and at least a second position where it prevents access to the crucible; wherein simultaneous vibration of the crucible by the vibration means and stirring of the mixture by the tines is enabled with the tines moving through the dross in a shearing action mixing and tumbling the mixture and causing the droplets of aluminium to coalesce.

The tines are removably attached to the rotatable plate for cleaning or repair.

The shroud may be formed from a heat insulating material and may be located adjacent the rotatable means to be lowered with the paddle means to cover the crucible in use.

The screening means can be removably mounted to the frame. In this embodiment, the movable portion may comprise a door that is retractable to allow access to the table of the apparatus. The door can be adapted to move upwardly, sidewards or downwardly to provide a portal for access to the table. The door can be slidably movable relative to the remainder of the screening means. In another embodiment, the door can be pivotally mounted to the wall. When the door is fully retracted, the portal must be of sufficient size to allow the crucible to pass through the portal.

In another embodiment, the entire screening means can be movable between the first retracted position and the second position. In this embodiment, the screening means can extend downwardly from the lowering means for the paddle means and is so movable relative to the table and crucible in concert with the operation of the lowering means.

The screening means is preferably adapted to prevent or at least ameliorate the escape of heat from the vicinity of the crucible. By preventing the escape of heat, the screening means serves to protect workers working near the apparatus. It also serves to slow the rate of cooling of the crucible and its contents which is desirable. The screening means can also preferably be adapted to prevent or at least substantially prevent the escape of dust and flame from the vicinity of the crucible. The screening means can also be adapted to safeguard workers working in the vicinity of the apparatus from explosions of aluminium and dross from the crucible.

The screening means is preferably formed from a multi-layer structure, comprising at least an inner layer and an outer layer. The inner and outer layer can be fabricated from a suitable metal or other material, including refractory or cementitious materials.

The crucible may be made of a refractory material having a metallic outer skin spaced from the refractory material by a layer of insulation. The crucible can be provided with a covering means that at least partially covers the upper opening of the crucible. The cover can be retractable or otherwise removable from the crucible when the paddle or stirring means is relatively lowered into the crucible. If desired, the cover can be adapted to surround the shaft of the paddle or stirring means while the paddle or stirring means is stirring the crucible's contents.

The table may be mounted on springs to assist in vibrating the crucible. Vibration of the table and crucible may be achieved by the mounting of at least one ultrasonic transducer, electric vibrator, mechanical vibrator or a combination of one or more of these transducers to the crucible and/or table. The table can be vibrated such that it oscillates in a horizontal axis, a vertical axis or in both axes.

The frame may consist of two or more upright pillars. A cross-beam may be supported by the frame and that cross-beam may carry the rotating means. The shaft for the blades may depend down from the cross-beam with the blades mounted on the lower end of that shaft.

The apparatus can include one or more exhaust pipes that allow gaseous product from the process performed by the apparatus to be vented to atmosphere outside the screening means. The exhaust pipes can incorporate bagging systems that collect the exhaust gaseous product for later disposal. The bagging systems can be adapted to also or instead extract dust from the gaseous product. The exhaust systems can also include filtering or scrubbing means that clean or substantially clean the gaseous product from the process of harmful or potentially harmful constituents.

The apparatus can include a weighing means, such as an electronic or mechanical scale, that allows measurement of the weight of the crucible and its contents while the crucible is sitting on the table. The apparatus can also include a control means. The control means is preferably adapted to allow an operator to operate all features of the apparatus from a central location. In a further preferred embodiment, the control means can be automated such that the apparatus runs normally without operator input.

The control means may also control the sequence and rate of the vibrations.

While the size of the crucible containing the dross is not important, typically the crucible should be large enough to carry between 800 kilograms to 1.5 tonne of dross. The process takes approximately 10 minutes and removes up to 95% of the aluminium in the dross, hence the present invention can separate approximately 1000 kilograms of aluminium from dross every 4–10 minutes.

Typically, the crucible will include plugholes which are plugged prior to carrying out the separation process with for example a cone or a sand and clay solution, and are unplugged to drain the crucible into a draining pan.

In yet a further aspect, the invention involves a method for separating molten aluminium from a mixture of aluminium and aluminium dross comprising the steps of:

removing the mixture from a furnace containing molten aluminium;

transferring the hot dross to an insulated crucible;

transferring the crucible to a table means;

inserting a paddle means into the mixture in the crucible;

relatively lowering a screening means such that it substantially surrounds the crucible;

stirring the mixture with the paddle means and simultaneously vibrating the table and crucible to cause the oxide skin on aluminium droplets in the dross to break, and to cause the aluminium droplets to coalesce, such that the droplets enlarge in volume and in weight and tend to sink to the lower part of the crucible; and removing aluminium from the lower part of the crucible.

In still yet a further aspect, the invention involves a method of separating molten aluminium from a mixture of aluminium and aluminium dross comprising the steps of:

removing the mixture from a furnace containing molten aluminium;

transferring the hot dross to an insulated crucible;

transferring the crucible to a table means;

inserting a paddle means into the mixture in the crucible, the paddle means comprising a rotatable means and a plurality of tines depending from the rotatable means said tines having a generally triangular cross section, with a tip or ridge of the triangular cross section being uppermost in use when the tines are lowered into the crucible;

relatively lowering a screening means such that it substantially surrounds the crucible;

stirring the mixture with the tines and simultaneously vibrating the table and crucible with the tines moving through the dross in a shearing action mixing and tumbling the mixture to cause the oxide skin on aluminium droplets in the dross to break, and to cause the aluminium droplets to coalesce such that the droplets enlarge in volume and in weight and tend to sink to the lower part of the crucible; and removing aluminium from the lower part of the crucible.

The pure aluminium can then be either cast as an ingot or recycled straight back into the furnace containing molten aluminium or drained into a crucible.

The process is carried out without substantially cooling the dross, preferably at a temperature of about 750° C.

In a yet further aspect the invention provides an apparatus for separating molten aluminium from a mixture of molten aluminium and aluminium dross including:

a table for supporting an insulated crucible containing the mixture of molten aluminium and aluminium dross;

at least one heating means such as a gas burner of the like adapted to either preheat the paddles or heat the contents of the crucible or heat both.

a frame adapted to support a paddle means or stirring means, means for rotating the paddle means and means for relatively lowering the same into the mixture in the crucible for stirring the mixture with the paddle means enabling simultaneous vibration of the crucible and stirring of the mixture.

The gas burners of the like can be used to maintain the heat in the contents of the crucible during the stirring process. In contrast with prior art devices such as dross presses maintaining heat during the separation process has been found to be desirable.

BRIEF DESCRIPTION OF THE DRAWINGS

By way of example only, preferred embodiments of the invention will now be described with reference to the accompanying drawings, in which.

DETAILED DESCRIPTION OF THE PREFERRED EMBODIMENT

Figure 1:
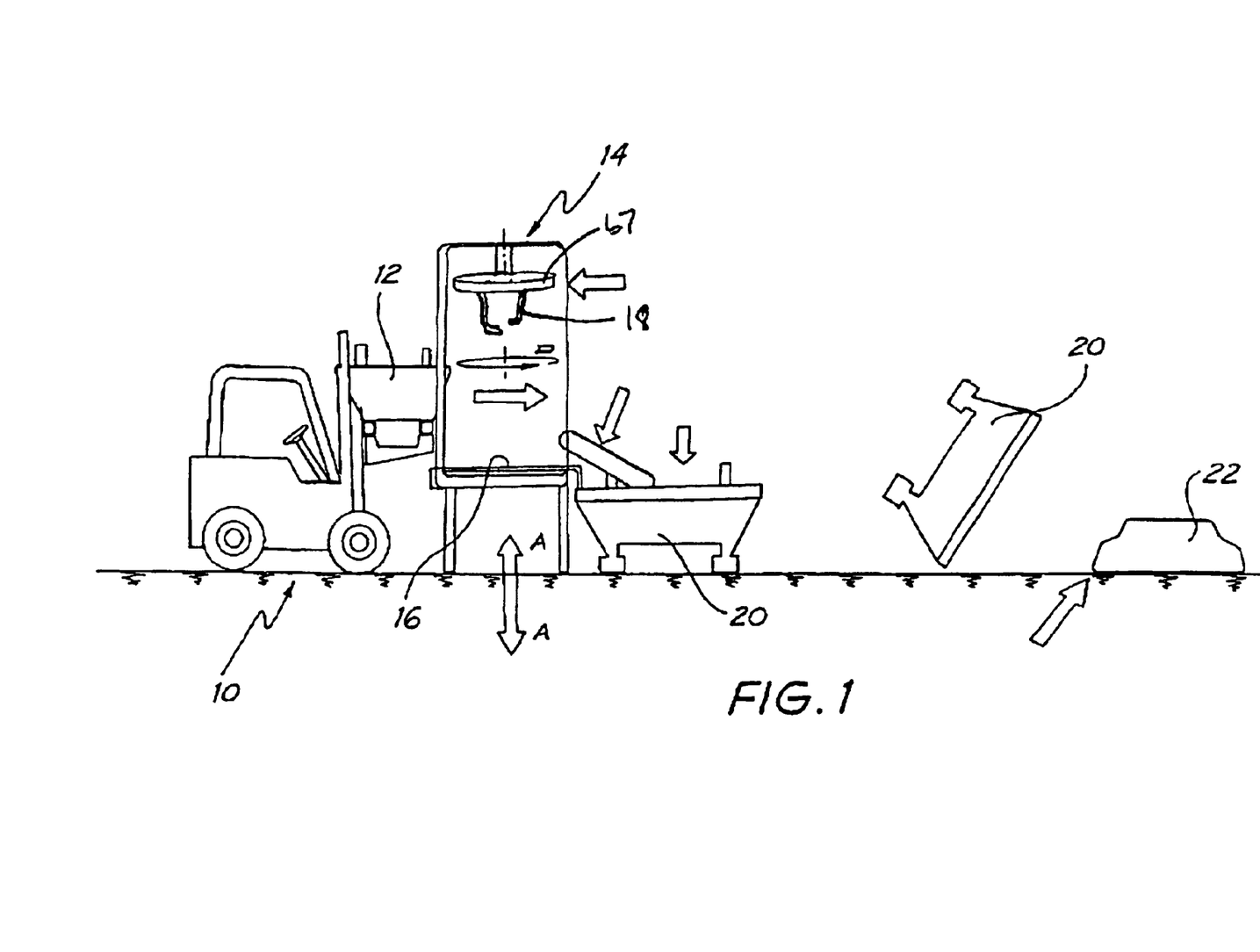
FIG. 1 is a schematic and simplified illustration showing steps in the process of the present invention.

Referring the to the drawings, FIG. 1 which is a simplified and schematic illustration of a process embodying the invention shows a fork-lift truck 10 transporting a crucible 12 containing dross at a temperature of about 750° C. to an apparatus, generally indicated at 14, for removing aluminium from the dross. The crucible is placed on a table 16 of the apparatus. Blades in the form of tines 18 described in more detail below are lowered into the molten dross. The table 16 is vibrated in a vertical direction, as illustrated by the arrows AA, the tines 18 rotate in the molten dross, and by virtue of the stirring and vibration, the aluminium droplets and particles in the dross coalesce to form larger droplets and gradually sink to the base of the crucible. The aluminium can then be drained out into a bucket 20 and either transferred directly back to the furnace or is allowed to cool to produce an aluminium ingot 22.

Figure 2:
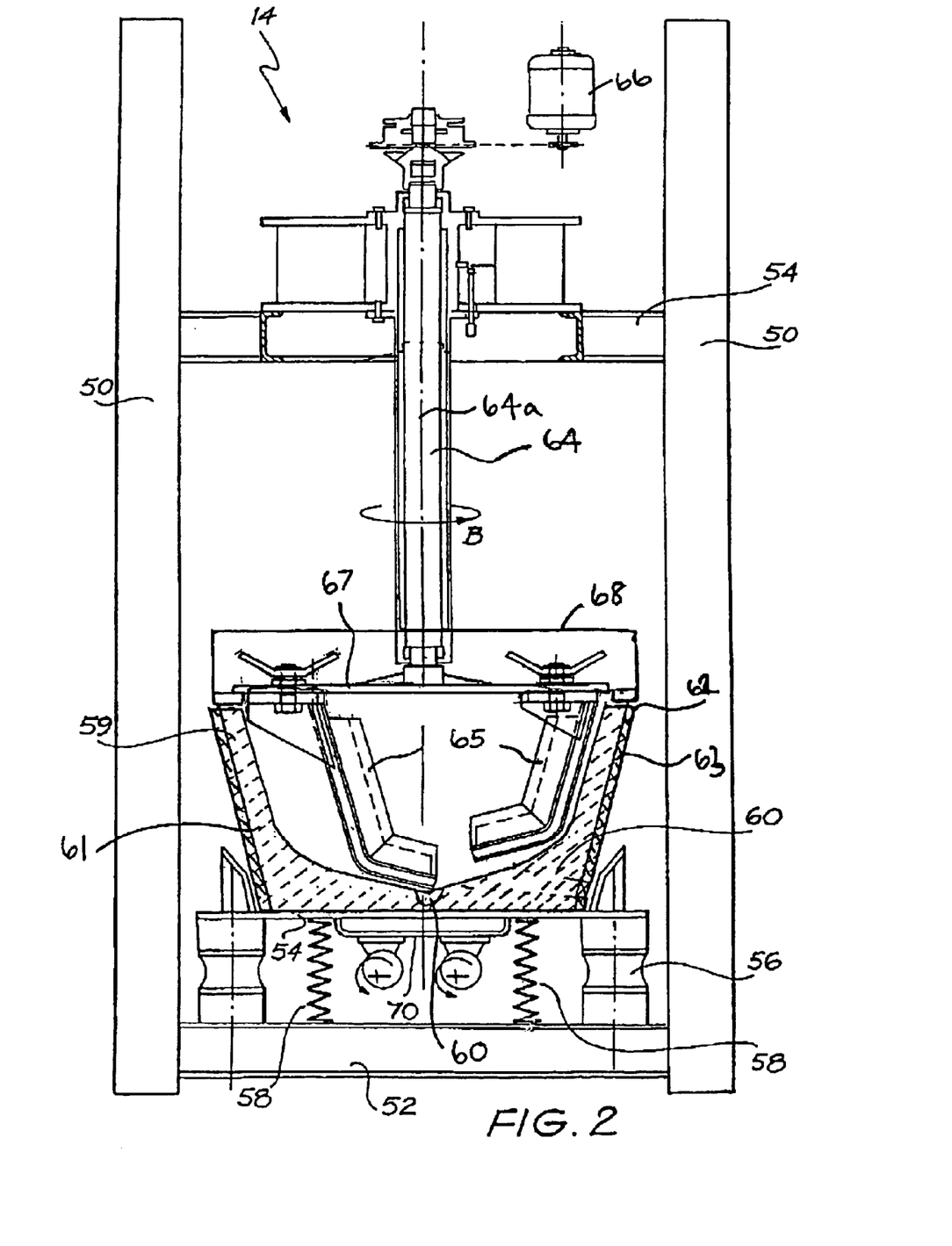
FIG. 2 is a detailed drawing of apparatus embodying the present invention but with an enclosure omitted.

FIG. 2 shows a more detailed drawing of the apparatus of the present invention with a protective enclosure which ordinarily encloses the apparatus, omitted for clarity. The device includes a frame comprised of a number of upright pillars or rails 50, a base 52 and cross beam 54. In plan view the frame includes four pillars located on the corners of a square. A table 54 is mounted on squat pillars 56 which rise up from the base 52. A number of springs 58 also extend between the base 52 and the table 54. On top of the table a crucible 59 is located. The crucible can be generally square or circular in plan view and has sides which taper outwardly. The inside of the base of the crucible is smooth without sharp corners, so that the dross can be stirred properly and so that the crucible can be cleaned easily. A pipe or channel 60 is formed in the base of the crucible which, when unblocked, allows molten metal to flow out from the crucible.

The crucible is made of a refractory material 61, having an outer skin 62 of metal and an insulating layer 63 disposed between the skin and the refractory material. Although refractory material has insulating properties, the insulating layer 63 further helps to prevent the dross cooling as it is transported to the table. A shaft 64 defining a longitudinal axis 64a depends from the cross-beam 54 and on the lower end of the shaft there are a series of tines or paddles 65 for stirring the contents of the crucible mounted on a rotatable plate 67. The shaft is movable relative to the cross-beam in the vertical direction to raise and lower the tines 65. A motor 66 is also provided to rotate the shaft in the direction B to stir the contents of the crucible by means of the tines 65. Also raised and lowered with the tines is a shroud or "hungry board" 68 which covers the top of the crucible when lowered. The shroud which is most preferably formed from a heat insulating material, assists in creating an oxygen reduced environment in the crucible during processing, compared with normal oxygen levels in atmospheric air. It also assists in maintaining the temperature of the contents of the crucible.

Figure 4:
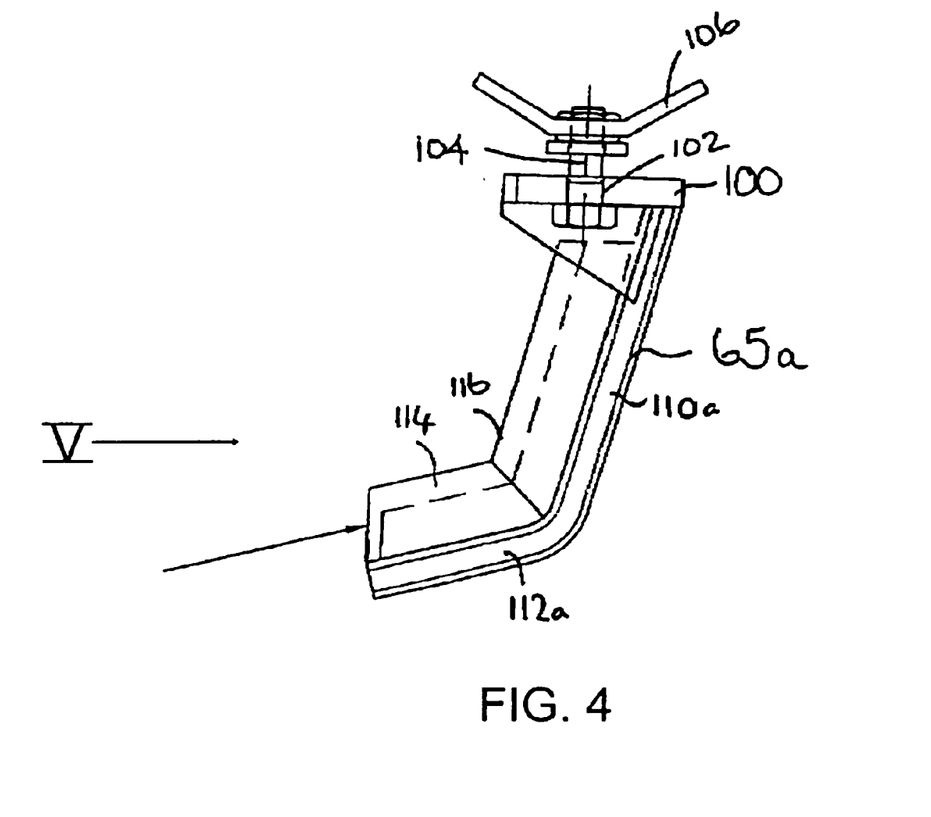
FIG. 4 shows a side view of a first tine for use in the apparatus.
Figure 5:
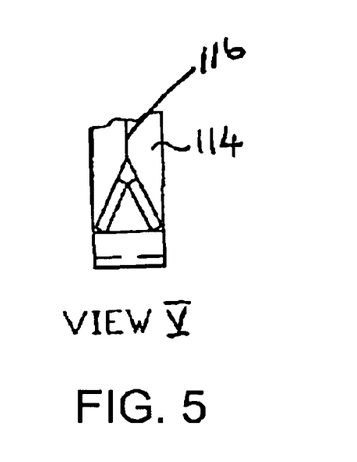
FIG. 5 is a view of on arrow V of FIG. 4.
Figure 6:
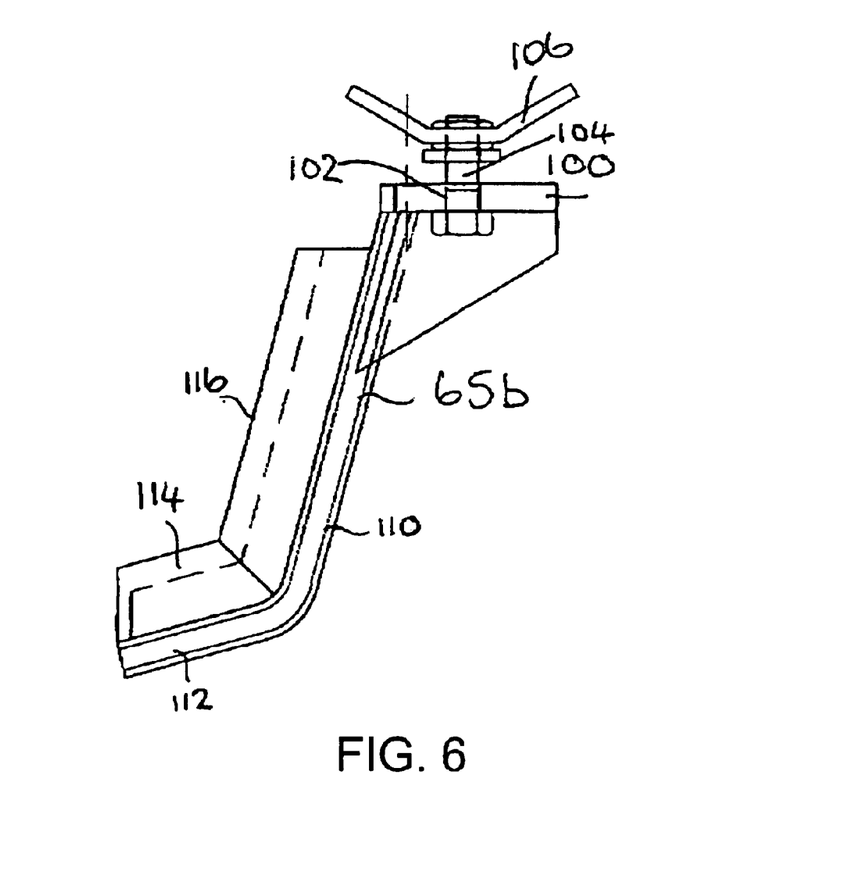
FIG. 6 shows a side view of a second tine.

The tines 65 are shown in more detail in FIGS. 4 to 6. There are two designs 65a and 65b respectively, one 65a for tines which are rotated in a circular near the walls of the crucible and the other 65b for tines which rotate in a tighter circular path nearer the centre of the crucible to ensure mixing of the entire contents of the crucible. At the top of each tine there is a horizontal plate 100 defining a hole 102 through which a bolt 104 extends. A wing nut 106 is threaded on the bolt by means of which the tine is removably clamped to the rotatable plate 67. Depending from the plate 100 is a flat bar 110 having a rectangular cross-section which depends down at an angle of about 70°–80° to the vertical and then bends through 100°–120° to define a relatively shorter tip portion 112 oriented at about 20°–30° to the horizontal. As is best shown in FIG. 5, an upper part 114 of the tine is fixed to the bar by welding. The upper part 114 is triangular in cross-section with the centre of the tine being hollow. The uppermost part of the tines define a pointed ridge 116. The tines are made of cast iron or cast steel.

The shape of the blades is beneficial in the stirring process since the dross is stirred without undue agitation. The shape of the blades cuts through the dross in a shearing action gently rolling the dross, mixing and tumbling it and causing the droplets of aluminium to coalesce. The shape of the tines has been found to greatly enhance the efficacy of the process.

Figure 3:
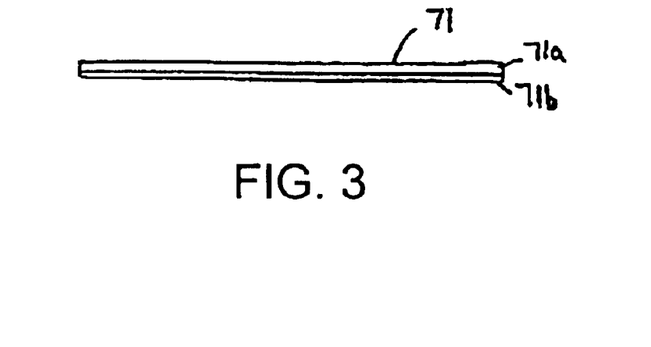
FIG. 3 is a detailed drawing of the apparatus depicted in FIG. 2 illustrating an enclosure, in particular.

FIG. 3 illustrates walls 71 mounted to the frame 50 of the apparatus 14. The walls are a multi-layer structure comprising a metallic inner layer 71a and a metallic outer layer 71b, illustrated in section in FIG. 3a. The walls 71 serve to prevent heat, dust, flame and explosion from escaping the vicinity of the crucible and endangering any workers working nearby. The walls 71 also serve to lessen the rate of temperature drop of the crucible and its contents during operation of the apparatus. Disposed on one face of the apparatus is an opening 72 provided by a sliding door 73 that can be raised or lowered as desired on rails. In the depicted embodiment, the door is shown in dashed outline since it has been retracted upwards behind the upper wall 71. The opening is of sufficient size to allow the fork-lift to insert the crucible into the apparatus. In FIG. 3, the device is depicted just after the crucible has been placed on the table 54 and with the blades 64 lowered into the crucible ready to stir the contents of the crucible. In normal operation, it would be anticipated that the door would be left open for a short as time as possible. Accordingly, in normal operation, it would be expected that the opening 72 would be closed by the door immediately after the crucible is placed on the table or as the blades 64 are lowered into the crucible.

In use, dross is taken from the furnace and placed straight into the crucible 59. The crucible is then moved by a fork-lift or the like and placed directly onto the table 54. Once the crucible is in place on the table, the blades/tines are lowered into the dross and the top of the crucible is covered by the shroud. The table on which the crucible sits is then vibrated in the vertical direction, at a rate of between 500 to 5,000 or more vibrations per minute. In the embodiment depicted in FIG. 2, the vibration of the table is achieved through use of electrical vibrators 70 mounted under the table 54. In other embodiments, the vibration may be achieved through use of one or more ultrasonic transducers, mechanical vibrators, or a combination of such vibrators mounted to the table 54. It is also possible to mount the electrical vibrators on the sides of the crucible or frame to provide horizontal vibration in addition to, or instead of, the vertical vibrations.

In normal operation, the blades 64 turn at a rate of between 3 to 40 rpm. The vibrations break the oxide layer surrounding the droplets of aluminium in the dross and allow the metal droplets to coalesce with the result that the droplets then become larger in volume and tend to sink to the bottom of the crucible where they can flow through the hole 60 into another bucket or drain pan. The tines cut through the dross in a shearing action gently rolling the dross, mixing and tumbling it and causing the droplets of aluminium to coalesce. The rate of vibration can change during the process and tends to start more slowly and then increase later for best results.

High vibrational rates are used to bond very small drops of liquid metal together and by utilising higher vibrational speeds a larger percentage of pure metal can be recovered. As discussed above, generally, the content of pure metal in dross from aluminium furnaces is usually between 30 to 60%, and once the process described above has been carried out on the dross the content of the remaining aluminium in the dross tends to be in the range of 3 to 5%. Both stirring and vibrating is needed.

The specific embodiment described above refers to vibrating the crucible in a generally vertical axis, and generally horizontal stirring, stirring and vibration could take place in other axes and by other methods. An important feature of the invention is that sufficient agitation, vibration, or stirring occurs at rates which cause the aluminium droplets to coalesce.

Figure 7:
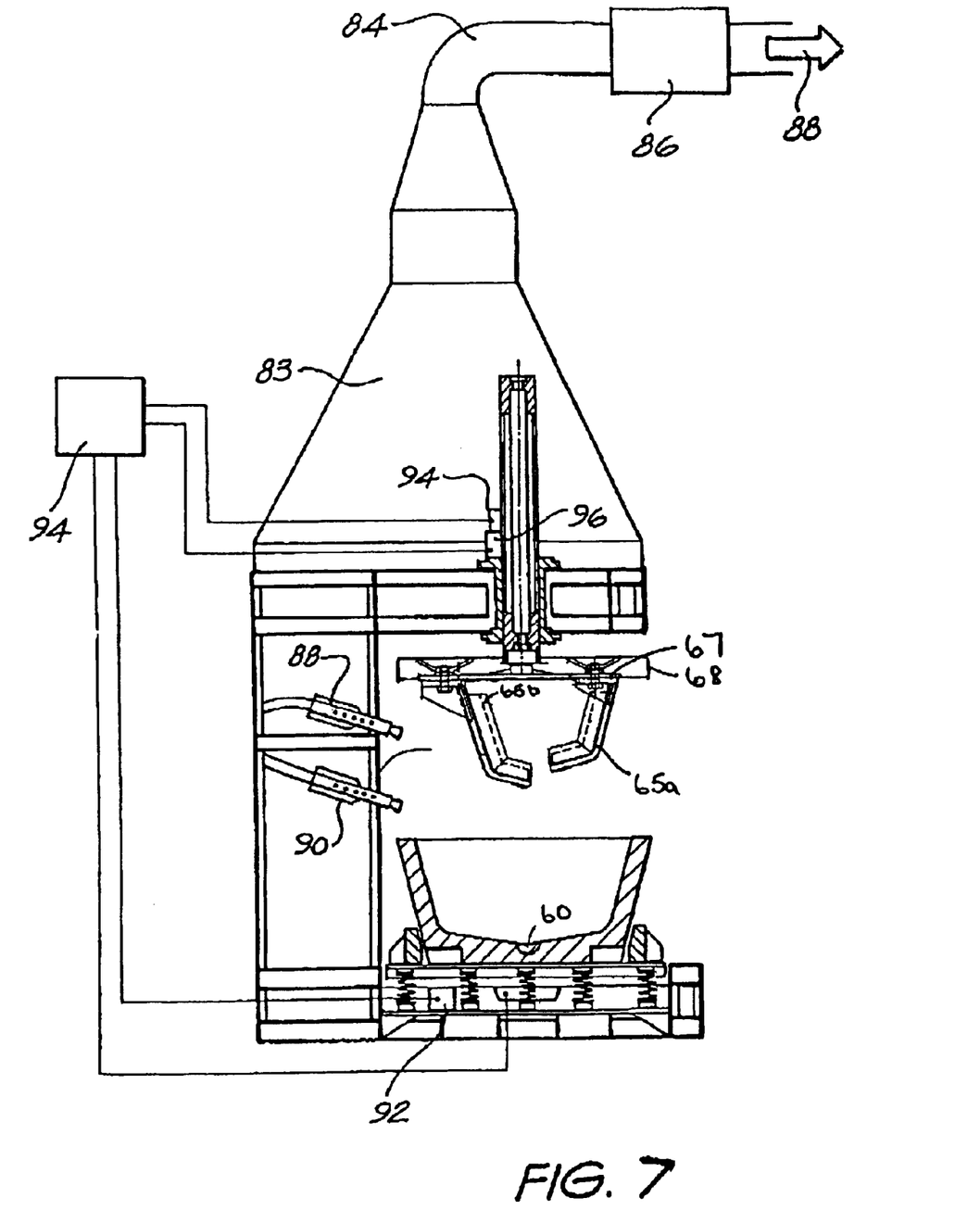
FIG. 7 is a side view of a variation on the apparatus shown in FIG. 2.

FIG. 7 shows a variant of the apparatus shown in FIGS. 2 and 3 having a number of additional features. First a hood 83 is provided and exhaust pipe 84 are also provided to allow safe extraction of dust and/or gaseous product from the process. A bagging system 86 for the capture of dust passing through the exhaust pipe is also provided so that gases leaving the exit 88 of the pipe are clean.

FIG. 7 also illustrates the provision of two gas burners 88 and 90. The gas burner 88 is used to preheat the paddles/tines and burner 90 can be used to heat the surface of the contents of the crucible to assist in preventing solidification of the aluminium.

A further additional feature is the provision of a weighing means such as electronic scales adapted to weigh the crucible and contents and transmit that information to a computer control unit 94. The control unit also receives inputs from sensors 96 associated with the paddle drive means which measure the force required to turn the paddles. From this information the control means can determine the optimal stirring time and feed control signals to a control box 94 which controls the rate and duration of stirring. The control means can also be used to control the sequence and rate of vibrations.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

What is claimed is:

1. An aluminium processing apparatus for separating molten aluminium from a mixture of molten aluminium and aluminium dross comprising:

a table for supporting an insulated crucible, the crucible having an open top for containing the mixture of molten aluminium and aluminium dross;

vibration means for vibrating the crucible when supported on the table;

a frame adapted to support a paddle means, means for rotating the paddle means and means for relatively lowering the paddle means into the mixture in the crucible for stirring the mixture with the paddle means, the paddle means comprising a rotatable plate and a plurality of tines having a generally triangular cross section attached to the plate, with a ridge of the triangular cross section being uppermost in use when the tines are lowered into the crucible;

a shroud adapted to cover the top of the crucible and maintain an oxygen reduced atmosphere in the crucible; and a screening means comprising walls mounted to the frame which substantially surround the crucible when it is supported by the table, the screening means having at least a movable portion thereof movable between at least a first retracted position to allow access to the crucible and at least a second position where it prevents access to the crucible;

wherein simultaneous vibration of the crucible by the vibration means and stirring of the mixture by the tines is enabled with the tines moving through the dross in a shearing action mixing and tumbling the mixture and causing the droplets of aluminium to coalesce.

2. The aluminium processing apparatus of claim 1, wherein the tines are removably attached to the plate.

3. The aluminium processing apparatus of claim 1, wherein the shroud is formed from a heat insulating material and is located adjacent the rotatable means to be lowered with the paddle means to cover the crucible in use.

4. The aluminium processing apparatus of claim 1, wherein the movable portion of the screening means door that is retractable behind the screening means to provide a portal for access to the table.

5. The aluminium processing apparatus of claim 4, wherein the door is slidably movable relative to the remainder of the screening means.

6. The aluminium processing apparatus of claim 5, wherein the screening means is formed from a multi-layer structure, comprising at least an inner layer and an outer layer.

7. The aluminium processing apparatus of claim 1, wherein the paddle means comprises a plurality of tines mounted on a shaft defining a longitudinal axis supported by a frame, the shaft being adapted to be raised or lowered so that the blades may be raised when a new crucible is placed on the table located underneath the tines.

8. The aluminium processing apparatus of claim 7, wherein, in use, the shaft is located above the centre of the crucible and is rotated about its longitudinal axis by a rotating means.

9. The aluminium processing apparatus of claim 1, wherein the table is mounted on springs to assist in vibrating the crucible.

10. The aluminium processing apparatus of claim 8, wherein the frame includes two or more upright pillars and a cross-beam supported by the frame and wherein the cross-beam carries the rotating means and the shaft depends down from the cross-beam.

11. The aluminium processing apparatus of claim 1, further including one or more exhaust pipes that allow gaseous product from the process performed by the apparatus to be vented to atmosphere outside the screening means wherein the exhaust pipes incorporate a bagging system that collects the exhaust gaseous product for later disposal and extracts dust from the gaseous product and wherein the exhaust systems also include filtering or scrubbing means for cleaning or substantially cleaning the gaseous product from the process of harmful or potentially harmful constituents.

12. The aluminium processing apparatus of claim 1, further including a weighing means, such as an electronic or mechanical scale for measuring the weight of the crucible and its contents while the crucible is sitting on the table.

13. The aluminium processing apparatus of claim 11, further including a control means adapted to allow an operator to operate all features of the apparatus from a central location such that the apparatus runs normally without operator input.

14. The aluminium processing apparatus of claim 13, further including a sensor means for sensing the pressure on the paddles, the control means being arranged to determine the optimum stirring time and optimum sequence and rate of vibrations from the measurements of pressure on the paddles and/or the weight of the crucible and contents.

15. An aluminium processing apparatus for separating molten aluminium from a mixture of molten aluminium and aluminium dross comprising:
    a table for supporting an insulated crucible for containing the mixture of molten aluminium and aluminium dross;
    vibration means for vibrating the crucible when supported on the table;
    a frame adapted to support a paddle means, means for rotating the paddle means and means for relatively lowering the paddle means into the mixture in the crucible for stirring the mixture with the paddle means, the paddle means including a plurality of tines the upper portion of which defines a generally triangular cross section
    a shroud adapted to cover the top of the crucible and maintain an oxygen reduced atmosphere in the crucible; and
    a screening means comprising walls mounted to the frame which substantially surround the crucible when it is supported by the table, the screening means having at least a movable portion thereof movable between at least a first retracted position to allow access to the crucible and at least a second position where it prevents access to the crucible;
    wherein simultaneous vibration of the crucible by the vibration means and stirring of the mixture by the tines is enabled with the tines moving through the dross in a shearing action mixing and tumbling the mixture and causing the droplets of aluminium to coalesce.

16. The aluminium processing apparatus of claim 15, further including one or more exhaust pipes that allow gaseous product from the process performed by the apparatus to be vented to atmosphere outside the screening means wherein the exhaust pipes incorporate a bagging system that collects the exhaust gaseous product for later disposal and extracts dust from the gaseous product and wherein the exhaust systems also include filtering or scrubbing means for cleaning or substantially cleaning the gaseous product from the process of harmful or potentially harmful constituents.

17. An aluminium processing apparatus for separating molten aluminium from a mixture of molten aluminium and aluminium dross comprising:
    a table for supporting an insulated crucible containing the mixture of molten aluminium and aluminium dross, the table defining vibration means for vibrating so as to vibrate the crucible supported thereon;
    a frame adapted to support a paddle means or stirring means, means for rotating the paddle means and means for relatively lowering the paddle means into the mixture in the crucible for stirring the mixture with said paddle means, said paddle means comprising a plurality of tines having a generally triangular cross section;
    a screening means comprising walls mounted to the frame substantially surround the crucible when it is supported by the table, the screening means having at least a portion thereof movable between at least a first retracted position to allow access to the crucible and at least a second position where it prevents access to the crucible;
    a weighing means for weighing the crucible and any contents held therein supported on the table;
    a control means for controlling rotation of the paddle and operation of the vibration means further including sensor means for measuring the pressure on the paddles, the control means being operable to determine an optimum stirring time and sequence and rate of vibrations from the measurement of pressure on the paddles and the weight of the crucible as measured by the weighing means wherein simultaneous vibration of the crucible by the vibration means and stirring of the mixture by the tines is enabled with the tines moving through the dross in a shearing action mixing and tumbling the mixture and causing the droplets of aluminium to coalesce.

18. The aluminium processing apparatus of claim 17, further including one or more exhaust pipes that allow gaseous product from the process performed by the apparatus to be vented to atmosphere outside the screening means wherein the exhaust pipes incorporate a bagging system that collects the exhaust gaseous product for later disposal and extracts dust from the gaseous product and wherein the exhaust systems also include filtering or scrubbing means for cleaning or substantially cleaning the gaseous product from the process of harmful or potentially harmful constituents.

19. A method of separating molten aluminium from a mixture of aluminium and aluminium dross comprising the steps of:

removing the mixture from a furnace containing molten aluminium;

transferring the hot dross to an insulated crucible;

transferring the crucible to a table means;

inserting a paddle means into the mixture in the crucible, the paddle means comprising a rotatable means and a plurality of tines depending from the rotatable means said tines having a generally triangular cross section, with a tip or ridge of the triangular cross section being uppermost in use when the tines are lowered into the crucible;

relatively lowering a screening means such that it substantially surrounds the crucible;

stirring the mixture with the tines and simultaneously vibrating the table and crucible with the tines moving through the dross in a shearing action mixing and tumbling the mixture to cause the oxide skin on aluminium droplets in the dross to break, and to cause the aluminium droplets to coalesce such that the droplets enlarge in volume and in weight and tend to sink to the lower part of the crucible; and removing aluminium from the lower part of the crucible.

20. The method of claim 19, wherein the steps are carried out without substantially cooling the dross, preferably at a temperature of about 750° C.

21. The method of claim 20, further including the step of placing a shroud over the crucible during the stirring step.

* * * * *